(12) United States Patent
Poojary et al.

(10) Patent No.: US 12,184,325 B2
(45) Date of Patent: Dec. 31, 2024

(54) ADAPTIVE SPREADING FACTOR MATCHING FOR SINGLE CHANNEL LORA RECEIVERS

(71) Applicant: Saya Life, Inc., Los Angeles, CA (US)

(72) Inventors: Sanjay Poojary, Irvine, CA (US); Chongliang Li, Irvine, CA (US)

(73) Assignee: SAYA LIFE, INC., Los Angeles, CA (US)

( * ) Notice: Subject to any disclaimer, the term of this patent is extended or adjusted under 35 U.S.C. 154(b) by 0 days.

(21) Appl. No.: 18/189,902

(22) Filed: Mar. 24, 2023

(65) Prior Publication Data

US 2023/0308129 A1    Sep. 28, 2023

Related U.S. Application Data

(60) Provisional application No. 63/269,865, filed on Mar. 24, 2022.

(51) Int. Cl.
*H04B 1/7075* (2011.01)
*H04J 13/00* (2011.01)
*H04L 5/00* (2006.01)

(52) U.S. Cl.
CPC ........ *H04B 1/7075* (2013.01); *H04J 13/0044* (2013.01); *H04L 5/0048* (2013.01)

(58) Field of Classification Search
CPC ... H04B 1/7075; H04J 13/0044; H04L 5/0048
See application file for complete search history.

(56) References Cited

U.S. PATENT DOCUMENTS

2022/0182193 A1* 6/2022 Im ...................... H04L 5/0055
2022/0353054 A1* 11/2022 Yoshizawa .......... H04W 56/001

FOREIGN PATENT DOCUMENTS

EP           4346108 A1 *  4/2024  .............. H04B 1/69

OTHER PUBLICATIONS

Machine translation JP-6300893-B1. (Year: 2018).*
Machine translation KR-20200098003-A (Year: 2020).*
Machine translation of JP-2021093716-A. (Year: 2021).*
Machine translation of KR-20210066970-A. (Year: 2021).*

* cited by examiner

*Primary Examiner* — Jean B Corrielus
(74) *Attorney, Agent, or Firm* — NGUYEN TARBET IP LAW

(57) ABSTRACT

A single-channel Long Range (LoRa) receiver device. The device may comprise a communication component comprising a receiver spreading factor (SF), configured to accept LoRa signals. LoRa signals each comprise a transmitter SF. The communication component is only able to receive a LoRa signal if the receiver SF matches the transmitter SF. The device may change its receiver SF and detect LoRa signals. The device may then analyze a LoRa signal if the transmitter SF matches the receiver SF. The device may then synchronize the communication component to the LoRa signal, process the LoRa signal, and repeat changing, detecting, analyzing, and synchronizing until all LoRa signals in range are processed.

14 Claims, 2 Drawing Sheets

ADAPTIVE SPREADING FACTOR MATCHING FOR SINGLE CHANNEL LORA RECEIVERS

CROSS-REFERENCES TO RELATED APPLICATIONS

This application is a non-provisional and claims benefit of U.S. Provisional Application No. 63/269,865 filed Mar. 24, 2022, the specification of which is incorporated herein in its entirety by reference.

FIELD OF THE INVENTION

The present invention is directed to a Long Range (LoRa) receiver capable of synchronizing its spreading factor to a LoRa transmitter to receive transmissions from the said transmitter.

BACKGROUND OF THE INVENTION

LoRa (long-range) communication devices are used for low-power, wide-area network modulation through the use of spread-spectrum modulation and are commonly implemented in water and gas metering technologies due to their low power consumption, long-range, and ability to penetrate walls and other structures. In LoRa terms, the amount of spreading code applied to the original data signal is called the spreading factor (SF). LoRa modulation has a total of six spreading factors (SF7 to SF12). A single-channel LoRa receiver must use the same spreading factor as the transmitter to successfully communicate. Thus, transmitters with a different spreading factor from a given receiver would be unable to communicate via LoRa with the said receiver. Thus, there exists a present need for a LoRa receiver capable of synchronizing its spreading factors without extra packet exchanges.

BRIEF SUMMARY OF THE INVENTION

It is an objective of the present invention to provide devices and methods that allow for a LoRa receiver capable of synchronizing its spreading factors without extra packet exchanges, as specified in the independent claims. Embodiments of the invention are given in the dependent claims. Embodiments of the present invention can be freely combined with each other if they are not mutually exclusive.

The present invention features a single-channel Long Range (LoRa) receiver device. The device may comprise a communication component comprising a receiver spreading factor (SF), capable of detecting, analyzing, and receiving LoRa signals. The LoRa signals may each comprise a transmitter SF. The communication component is only able to receive a LoRa signal if the receiver SF matches the transmitter SF. The device may further comprise a processor and a memory component. The device may change its receiver SF and detect LoRa signals. The device may then analyze a LoRa signal if the transmitter SF matches the receiver SF. The device may then synchronize the communication component to the LoRa signal, process the LoRa signal, and repeat changing, detecting, analyzing, and synchronizing until all LoRa signals in range are processed.

The present invention features a method for spreading factor matching for a single-channel Long Range (LoRa) receiver device. The method may comprise providing the single-channel LoRa receiver device comprising a communication component comprising a receiver spreading factor (SF). The communication component may only receive a LoRa signal if the receiver SF matches the transmitter SF. The device may further comprise a processor and a memory component. The method may further comprise changing the receiver SF and detecting LoRa signals. The method may further comprise analyzing a LoRa signal if the transmitter SF of a LoRa signal matches the receiver SF. The method may further comprise synchronizing the communication component to the LoRa signal, processing the LoRa signal, and repeating, changing, detecting, analyzing, and synchronizing until all LoRa signals in range are processed.

One of the unique and inventive technical features of the present invention is the ability of the LoRa receiver device of the present invention to change its spreading factor. Without wishing to limit the invention to any theory or mechanism, it is believed that the technical feature of the present invention advantageously provides for the ability to synchronize to a plurality of transmitted LoRa signals regardless of their spreading factor as the receiver is able to match to all of them. None of the presently known prior references or work has the unique inventive technical feature of the present invention.

The present invention contributes to an advantage over prior systems for LoRa communication. For example, LoRaWAN as a data link layer specification uses LoRa as a physical layer and provides a star topology network between a gateway and end devices. In a LoRaWAN network, end devices don't communicate with each other and communication only happens between a gateway and end devices. A LoRaWAN gateway utilizes adaptive data rate (ADR) to enable listening for multiple channels and multiple spreading factors simultaneously for different end devices; However, ADR needs special hardware at a higher cost and energy consumption. The present invention provides a cost-effective way to build a single-channel gateway that supports multiple spreading factors simultaneously. Also, LoRaWAN specifies a single-hop network topology, and when an end device is out of the communication range of the gateway, a new network has to be added with a new gateway, thus increasing the overall network cost. The present invention also provides a cost-effective way to enable a multi-hop LoRa network with a low-cost repeater or router. In the LoRaWAN network, only multi-channel gateways with ADR hardware can communicate with end devices with multi-channel and data rates at the same time. This invention enables a way to build a gateway at the cost of an end device, even though limited to one channel only, as well as providing a cost-effective way to extend the network radius and overall throughput.

The inventive technical feature of the present invention contributed to a surprising result. For example, one skilled in the art would simply utilize a multi-channel LoRaWAN network capable of listening to multiple channels at a time in order to capture a plurality of LoRa signals with different transmitter spreading factors. The present invention implements a single-channel LoRa communicator capable of cycling through receiver spreading factors to synchronize with the plurality of LoRa signals with different transmitter spreading factors, which, surprisingly, is more cost-effective and energy-efficient overall than prior multi-channel LoRaWAN systems. Thus, the present invention contributed to a surprising result.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Following is a list of elements corresponding to a particular element referred to herein:
100 device
110 communication component
120 processor
130 memory component
200 LoRa signal The term "LoRa" as used herein is short for Long Range and refers to a lower-power wide-area network (LPWAN) modulation technique specified by LoRa Alliance.

The term "spreading factor" as used herein refers to the amount of spreading code applied to the original data signal in LoRa terms.

The term "synchronizing" as used herein refers to the process of matching the same parameters in order for network entities to communicate.

The term "physical layer frame" as used herein refers to the data communication unit at the physical layer as specified in the Open System Interconnection (OSI) model.

The term "preamble" as used herein refers to a predefined sequence of symbols for the receiver to know the frontier of real data.

Figure 1:
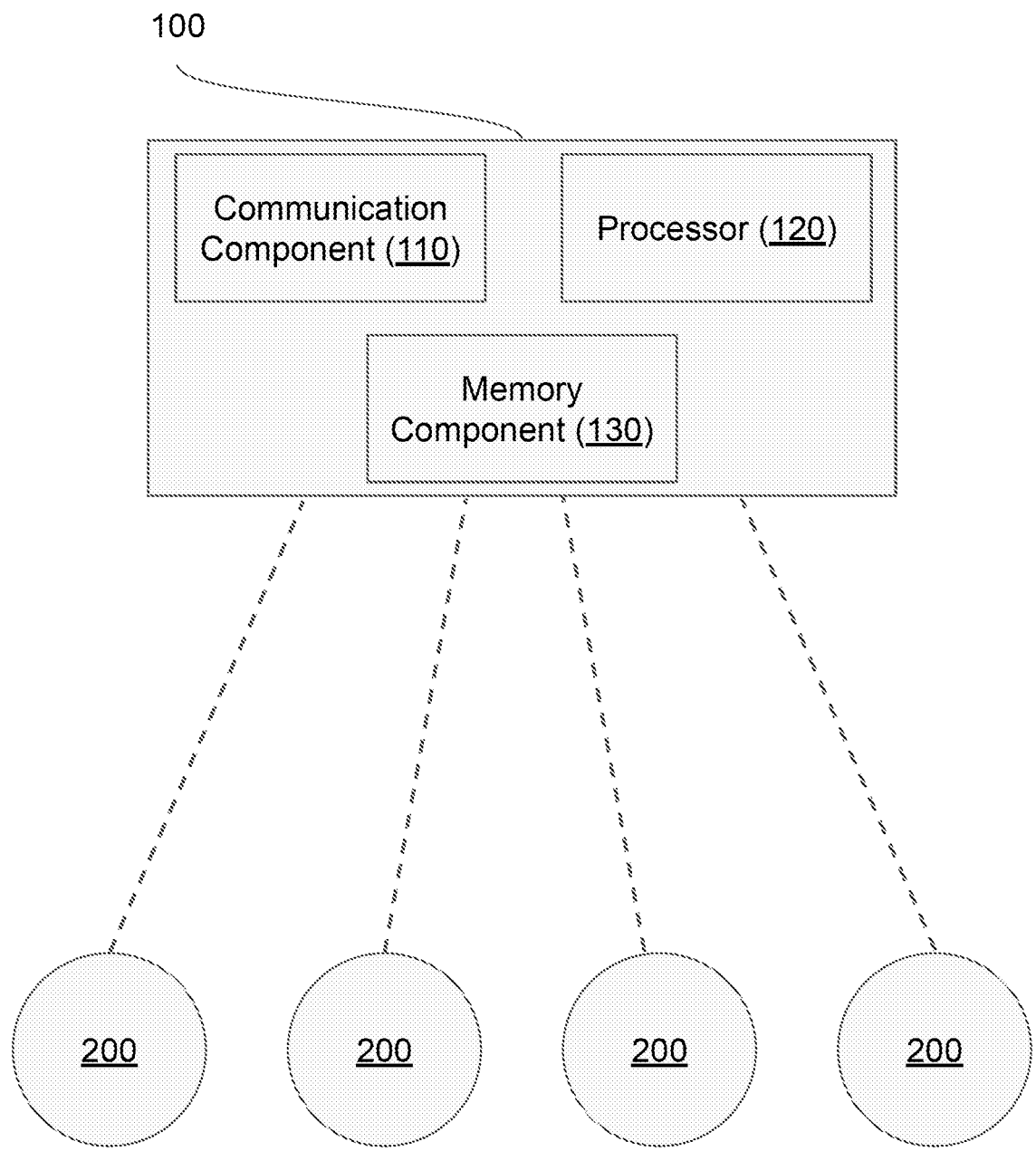
FIG. 1 shows a schematic diagram of the LoRa receiver device of the present invention configured to process a plurality of LoRa signals by changing the SF of the device.

Referring now to FIG. 1, the present invention features a single-channel Long Range (LoRa) receiver device (100). In some embodiments, the receiver device (100) may further be configured to receive LoRa wide area network (LoRaWan) signals as well. In some embodiments, the device (100) may comprise a communication component (110) comprising a receiver spreading factor (SF), configured to detect, analyze, and receive one or more LoRa signals, each LoRa signal (200) comprising a transmitter SF. Analyzing the one or more LoRa signals may comprise checking if the receiver SF matches the transmitter SF of the LoRa signal (200). Synchronizing the communication component (110) to the LoRa signal (200) may comprise instructing the communication component (110) to maintain its current receiver SF so that the communication component (110) can stay locked into the LoRa signal (200). Processing the LoRa signal (200) may comprise decoding the information contained in the LoRa signal (200).

In some embodiments, the communication component may comprise an antenna, a modem, a transceiver, and/or a Microcontroller Unit (MCU). The range of the device (100) of the present invention may be a maximum of 2 km in non-line-of-sight (NLOS) conditions and 20 km in line-of-sight (LOS) conditions. The communication component (110) may only receive a LoRa signal (200) if the receiver SF matches the transmitter SF. The device (100) may further comprise a processor (120) operatively coupled to the communication component (110), configured to execute computer-readable instructions and a memory component (130) operatively coupled to the processor (120), comprising a plurality of computer-readable instructions. The computer-readable instructions may comprise changing, by the communication component (110), the receiver SF and detecting, by the communication component (110), the one or more LoRa signals. The plurality of computer-readable instructions may further comprise analyzing the one or more LoRa signals and synchronizing the communication component (110) to the LoRa signal (200) if the transmitter SF of a LoRa signal (200) of the one or more LoRa signals matches the receiver SF. The plurality of computer-readable instructions may further comprise processing the LoRa signal (200) and repeating, changing, detecting, analyzing, and synchronizing until all LoRa signals of the one or more LoRa signals are processed. In some embodiments, the communication component (110) may continuously search for LoRa signals.

Figure 2:
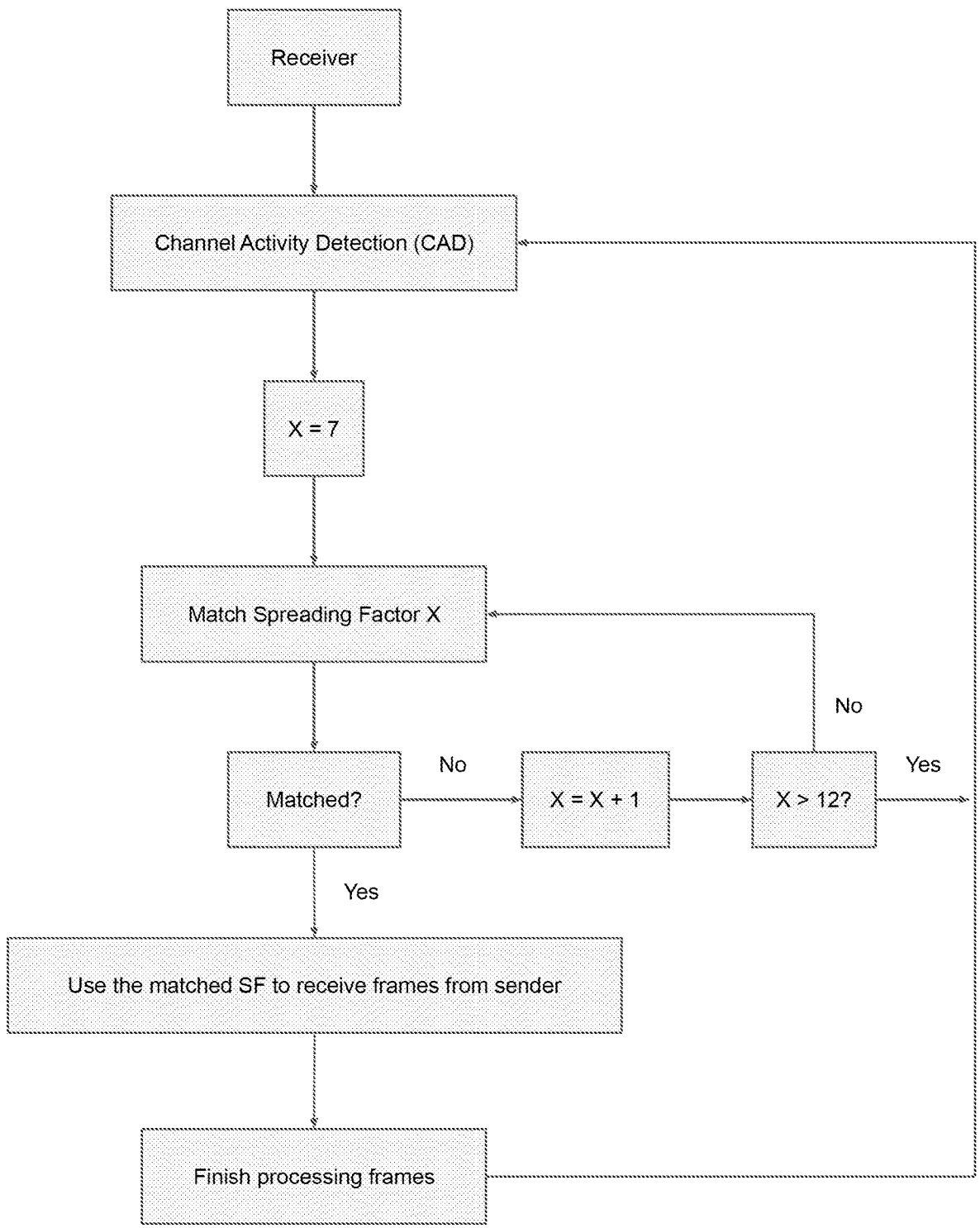
FIG. 2 shows a flow chart of a method of the present invention for spreading factor matching for a single-channel LoRa receiver device.

Referring now to FIG. 2, the present invention features a method for spreading factor matching for a single-channel Long Range (LoRa) receiver device (100). In some embodiments, the method may comprise providing the single-channel LoRa receiver device (100) comprising a communication component (110) comprising a receiver spreading factor (SF), configured to detect, analyze, and receive one or more LoRa signals, each LoRa signal (200) comprising a transmitter SF. The communication component (110) may only receive a LoRa signal (200) if the receiver SF matches the transmitter SF. The device (100) may further comprise a processor (120) operatively coupled to the communication component (110), configured to execute computer-readable instructions and a memory component (130) operatively coupled to the processor (120), comprising a plurality of computer-readable instructions. The method may further comprise changing, by the communication component (110), the receiver SF and detecting, by the communication component (110), the one or more LoRa signals. The method may further comprise analyzing the one or more LoRa signals and synchronizing the communication component (110) to the LoRa signal (200) if the transmitter SF of a LoRa signal (200) of the one or more LoRa signals matches the receiver SF. The method may further comprise processing the LoRa signal (200) and repeating, changing, detecting, analyzing, and synchronizing until all LoRa signals of the one or more LoRa signals are processed. Processing the LoRa signal (200) may comprise accepting the data contained in the LoRa signal and transmitting it to a separate computing device to be stored and/or analyzed.

In some embodiments, changing the receiver SF comprises sequentially changing the receiver SF. The receiver SF may be changed from SF7 to SF12 (from SF7 to SF8, SF8 to SF9, etc.) or from SF12 to SF7 (from SF12 to SF11, SF11 to SF10, etc.). The pattern in which the receiver SF is changed may comprise any repetitive pattern that would allow the receiver SF to change to every possible SF. Each LoRa signal (200) of the one or more LoRa signals may comprise a physical layer frame, wherein the physical layer frame comprises a preamble. The preamble may comprise the transmitter SF. The device (100) may be implemented into a water meter, a gas meter, any LoRa end devices, repeaters, gateways, or any system that involves the mass transmission of signals over LoRa to a central source.

The present invention features a computer-readable medium for spreading factor matching for a single-channel Long Range (LoRa) receiver device (100). The LoRa receiver device (100) may comprise a communication component (110). The communication component (110) may comprise a receiver spreading factor (SF), configured to detect, analyze, and receive one or more LoRa signals. Each LoRa signal (200) may have a transmitter SF. The communication component (110) may only receive a LoRa signal (200) if the receiver SF matches the transmitter SF. The computer-readable medium may comprise computer-readable program code for changing, by the communication component (110), the receiver SF, detecting, by the communication component (110), the one or more LoRa signals, analyzing the one or more LoRa signals and synchronizing the communication component (110) to the LoRa signal (200) if the transmitter SF of a LoRa signal (200) of the one or more LoRa signals matches the receiver SF. The computer-readable program code may further comprise processing the LoRa signal (200) and repeating, changing, detecting, analyzing, and synchronizing until all LoRa signals of the one or more LoRa signals are processed. In some embodiments, the communication component (110) may continuously search for LoRa signals. In some embodiments, changing the receiver SF may comprise sequentially changing the receiver SF. This may comprise changing the receiver SF from SF7 to SF12, from SF12 to SF7, or any other repetitive pattern. Each LoRa signal (200) of the one or more LoRa signals may comprise a physical layer frame. The physical layer frame may comprise a preamble. The preamble may comprise the transmitter SF.

In non-limiting embodiments, the device (100) of the presently claimed invention may be used with a water meter, gas meter, or electric meter by any LoRa end-devices like sensors, actuators, intermediate devices like repeaters, routers, aggregation devices like gateways, hubs. In these embodiments, the meter may comprise the entire gateway functionality for receiving data from every sensor in a network. Changing the receiver SF allows for all sensors to be processed regardless of their transmitter SF. In some embodiments, the SF changing technology of the present invention may be implemented in any pre-existing LoRa device. Specifically, the SF-changing technology of the present invention may allow a pre-existing single-channel receiver to gain the capability to receive LoRa signals from any transmitter SF.

The computer system can include a desktop computer, a workstation computer, a laptop computer, a netbook computer, a tablet, a handheld computer (including a smartphone), a server, a supercomputer, a wearable computer (including a SmartWatch™), or the like and can include digital electronic circuitry, firmware, hardware, memory, a computer storage medium, a computer program, a processor (including a programmed processor), an imaging apparatus, wired/wireless communication components, or the like. A LoRa device may comprise a radio module comprising a communication component, a processor, and a memory component. A communication component may comprise an antenna, the antenna comprising a spring antenna, a printed circuit board (PCB) antenna, a flexible printed circuit (FPC) antenna, an Ipex-1 subminiature version A (SMA) antenna, or a combination thereof. The computing system may include a desktop computer with a screen, a tower, and components to connect the two. The tower can store digital images, numerical data, text data, or any other kind of data in binary form, hexadecimal form, octal form, or any other data format in the memory component. The data/images can also be stored in a server communicatively coupled to the computer system. The images can also be divided into a matrix of pixels, known as a bitmap that indicates a color for each pixel along the horizontal axis and the vertical axis. The pixels can include a digital value of one or more bits, defined by the bit depth. Each pixel may comprise three values, each value corresponding to a major color component (red, green, and blue). A size of each pixel in data can range from 8 bits to 24 bits. The network or a direct connection interconnects the imaging apparatus and the computer system.

The term "processor" encompasses all kinds of apparatus, devices, and machines for processing data, including by way of example a programmable microprocessor, a microcontroller comprising a microprocessor and a memory component, an embedded processor, a digital signal processor, a media processor, a computer, a system on a chip, or multiple ones, or combinations, of the foregoing. The apparatus can include special-purpose logic circuitry, e.g., an FPGA (field programmable gate array) or an ASIC (application-specific integrated circuit). Logic circuitry may comprise multiplexers, registers, arithmetic logic units (ALUs), computer memory, look-up tables, flip-flops (FF), wires, input blocks, output blocks, read-only memory, randomly accessible memory, electronically-erasable programmable read-only memory, flash memory, discrete gate or transistor logic, discrete hardware components, or any combination thereof. The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures. The processor may include one or more processors of any type, such as central processing units (CPUs), graphics processing units (GPUs), special-purpose signal or image processors, field-programmable gate arrays (FPGAs), tensor processing units (TPUs), and so forth.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other units suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, a data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be or can be included in, one or more separate physical components or media (e.g., multiple CDs, drives, or other storage devices). The operations described in this specification can be implemented as operations performed by a data processing apparatus on data stored on one or more computer-readable storage devices or received from other sources.

Program code embodied on a computer-readable medium may be transmitted using any appropriate medium, including but not limited to wireless, wireline, optical fiber cable, RF, Bluetooth, storage media, computer buses, etc., or any suitable combination of the foregoing. Computer program code for carrying out operations for aspects of the present disclosure may be written in any combination of one or more programming languages, including an object-oriented programming language such as Java, Smalltalk, C #, Ruby, or the like, conventional procedural programming languages, such as Pascal, FORTRAN, BASIC, or similar programming languages, programming languages that have both object-oriented and procedural aspects, such as the "C" programming language, C++, Python, or the like, conventional functional programming languages such as Scheme, Common Lisp, Elixir, or the like, conventional scripting programming languages such as PHP, Perl, Javascript, or the like, or conventional logic programming languages such as PROLOG, ASAP, Datalog, or the like.

The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated into, special-purpose logic circuitry.

Computers typically include known components, such as a processor, an operating system, system memory, memory storage devices, input-output controllers, input-output devices, and display devices. It will also be understood by those of ordinary skill in the relevant art that there are many possible configurations and components of a computer which may also include cache memory, a data backup unit, and many other devices. To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user. Examples of input devices include a keyboard, cursor control devices (e.g., a mouse or a trackball), a microphone, a scanner, and so forth, wherein the user can provide input to the computer. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. Examples of output devices include a display device (e.g., a monitor or projector), speakers, a printer, a network card, and so forth. Display devices may include display devices that provide visual information, this information typically may be logically and/or physically organized as an array of pixels. In addition, a computer can interact with a user by sending documents to and receiving documents from a device that is used by the user; for example, by sending web pages to a web browser on a user's client device in response to requests received from the web browser.

An interface controller may also be included that may comprise any of a variety of known or future software programs for providing input and output interfaces. For example, interfaces may include what are generally referred to as "Graphical User Interfaces" (often referred to as GUIs) that provide one or more graphical representations to a user. Interfaces are typically enabled to accept user inputs using means of selection or input known to those of ordinary skill in the related art. In some implementations, the interface may be a touch screen that can be used to display information and receive input from a user. In the same or alternative embodiments, applications on a computer may employ an interface that includes what are referred to as "command line interfaces" (often referred to as CLIs). CLIs typically provide a text-based interaction between an application and a user. Typically, command line interfaces present output and receive input as lines of text through display devices. For example, some implementations may include what is referred to as a "shell" such as Unix Shells known to those of ordinary skill in the related art, or Microsoft® Windows Powershell which employs object-oriented type programming architectures such as the Microsoft® .NET framework.

Those of ordinary skill in the related art will appreciate that interfaces may include one or more GUIs, CLIs, or a combination thereof. A processor may include a commercially available processor such as a Celeron, Core, or Pentium processor made by Intel Corporation®, a SPARC processor made by Sun Microsystems®, an Athlon, Sempron, Phenom, or Opteron processor made by AMD® Corporation, or it may be one of the other processors that are or will become available. Some embodiments of a processor may include what is referred to as a multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related field will appreciate that a processor may be configured in what is generally referred to as 32 or 64-bit architectures, or other architectural configurations now known or that may be developed in the future.

A processor typically executes an operating system, which may be, for example, a Windows-type operating system from Microsoft® Corporation; the Mac OS X operating system from Apple® Computer Corp.; a Unix® or Linux®-type operating system available from many vendors, or what is referred to as an open-source; another or a future operating system; or some combination thereof. An operating system interfaces with firmware and hardware in a well-known manner and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, communication control, and related services, all in accordance with known techniques.

Connecting components may be properly termed "computer-readable media." For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of the medium. Combinations of media are also included within the scope of computer-readable media.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A single-channel Long Range (LoRa) receiver device (100) comprising:
    a. a communication component (110) comprising a receiver spreading factor (SF), configured to detect, analyze, and receive one or more LoRa signals, each LoRa signal (200) comprising a transmitter SF, wherein the communication component (110) is configured to only receive a LoRa signal (200) of the one or more LoRa signals if the receiver SF matches the transmitter SF;
    b. a processor (120) operatively coupled to the communication component (110) configured to execute computer-readable instructions; and
    c. a memory component (130) operatively coupled to the processor (120) comprising the computer-readable instructions that, when executed by the processor, causes the processor to perform the following:
        i. changing, by the communication component (110), the receiver SF;
        ii. detecting, by the communication component (110), the one or more LoRa signals;
        iii. analyzing the one or more LoRa signals;
        iv. synchronizing, if the transmitter SF of the LoRa signal (200) of the one or more LoRa signals matches the receiver SE, the communication component (110) to the LoRa signal (200) of the one or more LoRa signals;
        v. processing the LoRa signal (200) of the one or more LoRa signals; and
        vi. repeating steps i-v until all of the one or more LoRa signals are processed.

2. The single-channel LoRa receiver device (100) of claim 1, wherein changing the receiver SF comprises sequentially changing the receiver SF.

3. The single-channel LoRa receiver device (100) of claim 2, wherein the receiver SF is changed from SF7 to SF12.

4. The single-channel LoRa receiver device (100) of claim 2, wherein the receiver SF is changed from SF12 to SF7.

5. The single-channel LoRa receiver device (100) of claim 1, wherein each LoRa signal (200) of the one or more LoRa signals comprises a physical layer frame, wherein the physical layer frame comprises a preamble, wherein the preamble comprises the transmitter SF.

6. The single-channel LoRa receiver device (100) of claim 1, wherein the device (100) is implemented into a water meter.

7. The single-channel LoRa receiver device (100) of claim 1, wherein the device (100) is implemented into a gas meter.

8. A method for spreading factor matching method for a single-channel Long Range (LoRa) receiver device (100), the single-channel LoRa receiver device (100) comprising a communication component (110) comprising a receiver spreading factor (SF) configured to detect, analyze, and receive one or more LoRa signals, each LoRa signal (200) comprising a transmitter SF, wherein the communication component (110) only receives a LoRa signal (200) of the one or more LoRa signals if the receiver SF matches a transmitter SF; a processor (120) operatively coupled to the communication component (110); and a memory component (130) operatively coupled to the processor (120), wherein the memory component (130) comprises computer-readable instructions that, when executed by the processor (120), causes the processor to perform steps of the spreading factor matching method, the steps of the spreading factor matching method comprising:
- a. changing, by the communication component (110), the receiver SF;
- b. detecting, by the communication component (110), the one or more LoRa signals;
- c. analyzing the one or more LoRa signals;
- d. synchronizing, if the transmitter SF of the LoRa signal (200) of the one or more LoRa signals matches the receiver SF, the communication component (110) to the LoRa signal (200) of the one or more LoRa signals;
- e. processing the LoRa signal (200) of the one or more LoRa signals; and
- f. repeating steps a-e until all of the one or more LoRa signals are processed.

9. The method of claim 8, wherein changing the receiver SF comprises sequentially changing the receiver SF.

10. The method of claim 9, wherein the receiver SF is changed from SF7 to SF12.

11. The method of claim 9, wherein the receiver SF is changed from SF12 to SF7.

12. The method of claim 8, wherein each LoRa signal (200) of the one or more LoRa signals comprises a physical layer frame, wherein the physical layer frame comprises a preamble, wherein the preamble comprises the transmitter SF.

13. The method of claim 8, wherein the device (100) is implemented into a water meter.

14. The method of claim 8, wherein the device (100) is implemented into a gas meter.

* * * * *